United States Patent [19]
Pelton et al.

[11] Patent Number: 5,762,810
[45] Date of Patent: Jun. 9, 1998

[54] COALESCING OIL/WATER SEPARATOR

[76] Inventors: Paul Pelton, 520 Knob View Dr., Winston Salem, N.C. 27104; David A. Bryant, Rte. 5 Box 90-C, King, N.C. 27021

[21] Appl. No.: 755,397

[22] Filed: Nov. 22, 1996

[51] Int. Cl.$^6$ .................................................. C02F 1/40
[52] U.S. Cl. .................. 210/799; 210/802; 210/521; 210/540; 210/DIG. 5
[58] Field of Search ............................ 210/776, 799, 210/800, 802, 521, 522, 540, DIG. 5

[56] References Cited

U.S. PATENT DOCUMENTS

| | | | |
|---|---|---|---|
| 4,278,545 | 7/1981 | Batutis et al. | 210/DIG. 5 |
| 4,722,800 | 2/1988 | Aymong | 210/521 |
| 4,897,206 | 1/1990 | Castelli | 210/799 |
| 4,980,070 | 12/1990 | Lieberman | 210/DIG. 5 |
| 5,068,035 | 11/1991 | Mohr | 210/DIG. 5 |
| 5,246,592 | 9/1993 | Schweizer et al. | 210/799 |
| 5,296,150 | 3/1994 | Taylor, Jr. | 210/DIG. 5 |

*Primary Examiner*—Christopher Upton
*Attorney, Agent, or Firm*—Kilpatrick Stockton LLP

[57] ABSTRACT

A coalescing oil/water separator for removing free and dispersed oil from a wastewater stream with increased separation efficiency and producing a substantially oil-free effluent. The coalescing oil/water separator is self-contained in a tank shell and includes an improved oil coalescing medium for separating oil out of wastewater and a series of baffles and weirs to direct flow, skim the separated oil and control the liquid level in the separator. The improved oil coalescing medium is uniquely designed and sized to maximize the coalescing surface area in and the flow rate through a given volume of medium by including a plurality of molded, stackable perforated sheets or plates having an oleophilic surface and increased coalescing surface area for inducing impingement of oil droplets on the medium surface. Each stackable sheet includes a plurality of openings and recesses which are aligned and positioned to form numerous, closely spaced vertical and horizontal communicating passages for maximizing the flow rate of wastewater while simultaneously maximizing the coalescing surface area of the medium.

52 Claims, 7 Drawing Sheets

COALESCING OIL/WATER SEPARATOR

BACKGROUND OF INVENTION

1. Field of Invention

The subject invention is generally related to liquid pollutant separators and is specifically directed to a coalescing oil/water separator having an improved oil coalescing medium for removing free and dispersed oil from a wastewater stream.

2. Description of the Prior Art

Coalescing oil/water separators are known and used to separate petroleum products from a flow of contaminated water directed through the separator. In the past, various types of oil coalescing mediums have been used in oil/water separators to promote separation of oil out of wastewater. One example of such a medium is a barrier made of filaments of polypropylene positioned widthwise to the flow of wastewater. The affinity of oils to strips of polypropylene and the like is well known.

U.S. Pat. No. 4,333,835 issued to Lynch on Jun. 8, 1982 illustrates another type of separator which includes a plurality of elongated, hollow, stacked, perforated, vertical tubes that act as a medium for separating oil out of wastewater. The plurality of vertical tubes are welded together at the upper and lower ends of the tubes to form a medium constructed of a module of vertical, perforated tubes. In use, tiny droplets of oil accumulate on the foraminous walls of the vertical, perforated tubes. The droplets on the walls grow and the larger droplets then detach and float to the surface where the separated oil is then removed from the flow of wastewater.

Because the amount of coalescing surface area is directly proportional to the level of separation efficiency, it would be advantageous to increase the amount of surface area on which oil droplets may accumulate. However, one problem with increasing the surface area of the medium is that the increased surface area may undesirably interfere with the horizontal flow of the wastewater through the medium or with the vertical flow of the coalesced oil to the surface for removal. In the vertical tube separator disclosed in the '835 patent, there is approximately 45 square feet of surface area per cubic foot of space. (Column 5, lines 42–47). While the vertical tube separator is an improvement of the amount of surface area per cubic foot of medium provided by comparable prior art, there is a need for an improved oil coalescing medium which provides an increased surface area for attracting oil for increased separation efficiency while simultaneously maximizing the flow rate of a generally horizontal flow of wastewater directed through the medium.

SUMMARY OF THE INVENTION

The subject invention is directed to a coalescing oil/water separator for removing free and dispersed petroleum products with substantially increased separation efficiency from a flow of wastewater directed through the separator while simultaneously maximizing the flow of wastewater. The oil/water separator of the subject invention is a coalescing system including an improved oil coalescing medium for separating oil out of wastewater and a series of baffles and weirs to direct flow, skim the separated oil and control the liquid level in the separator. The oil/water separator performs the entire separation process with no moving parts and provides a low maintenance, readily utilized improved oil coalescing system for removing free and dispersed oils from wastewater.

In the preferred embodiment, the oil/water separator of the subject invention is designed to remove non-emulsified oil from a generally horizontal flow of wastewater directed therethrough to produce an effluent containing less than 10 mg/l of oil droplets larger than 20 microns. The oil/water separator includes a corrosion resistant tank shell; such as by way of example, a fiberglass, polypropylene or stainless steel tank shell, which is substantially rectangular and includes an inlet nozzle for receiving a flow of wastewater into the tank shell and an outlet pipe for discharging the treated, substantially oil-free water. The tank shell also has a series of chambers and baffles and weirs through which the wastewater flows including an inlet chamber, a separation chamber, an oil skimming apparatus, an oil retention baffle and an effluent weir. The self-contained oil/water separator of the subject invention requires no power source and efficiently separates and removes free and dispersed oil from the wastewater flow.

In use, a flow of wastewater is directed into the tank shell through the inlet nozzle and is dispersed evenly across the depth and width of the improved oil coalescing medium in the separation chamber. As the wastewater flows through the improved medium, oil is attracted to the surface of the medium and tiny globules of oil form and grow on the medium surface. When the oil globules reach a certain size, they detach and rise to the surface. Once the coalesced oil rises to the surface, the oil flows from the separator by gravity and is automatically skimmed off by the oil skimming apparatus. The clean water then flows under an oil retention baffle and over a weir cascading into a clean water chamber before exiting the oil/water separator through the outlet pipe.

The subject invention is specifically directed to the improved oil coalescing medium of the oil/water separator which is removably installed in the separation chamber of the tank shell. The improved coalescing medium or matrix is uniquely designed and sized to maximize the surface area in and the flow rate through a given volume of coalescing medium. The improved oil coalescing medium or matrix includes a plurality of molded, stackable, perforated sheets or plates having a surface with an affinity for oil and an increased coalescing surface area for inducing impingement of oil droplets on the medium surface. The stackable, perforated plates are designed to form numerous, closely spaced, communicating vertical and horizontal passages when stacked together. The improved design provides an oil coalescing medium with twice the surface area of the prior art media in the same volume for increased separation efficiency while still permitting a maximum flow rate of water through the medium without creating increased resistance.

In the preferred embodiment, each perforated, stackable sheet is approximately ½ inch thick and is constructed of a rigid, plastic material, such as by way of example, polypropylene. Each sheet is designed in a grid-type formation including a plurality of openings or perforations throughout the sheet and a plurality of recesses or indentions along the top and bottom surfaces of the sheet. The openings in each sheet are uniformly spaced and positioned to be vertically aligned with the openings of the adjacent stacked sheets to form vertical through passages between the stacked sheets of the medium through which coalesced oil rises to the surface and is skimmed off. The recesses or indentions along the top and bottom surfaces of the sheet are preferably semi-circular and positioned on the surfaces such that when a series of sheets are stacked together, the plurality of semi-circular recesses of one sheet are joined with a corresponding plurality of semi-circular recesses of another sheet to form circular openings and provide horizontal tubular passages through which a generally horizontal flow of wastewater passes through the improved medium. The openings forming the vertical passages through the medium and the recesses on the top and bottom surfaces of each sheet forming the horizontal passages through the medium are sized to maximize the surface area of the coalescing medium for significantly increasing the separation efficiency without increasing the resistance to wastewater flow therethrough to allow a maximum flow rate.

Each of the perforated, stackable sheets of the subject invention also include an attachment means for interlocking and holding the plurality of stacked sheets together which form the coalescing medium. In the preferred embodiment, the attachment means is a latching device having an integral slot at one end and a hook at the other end. When the sheets are stacked together the integral slot of one sheet receives the hook of the adjacent sheet to lock a series of sheets together. In addition, each sheet includes at least one small notch or duct on one surface and a complementary pin or dowel at the same place on the opposite surface of the sheet. When the plurality of sheets are stacked, the pin of one sheet fits in the notch of an adjacent, stacked sheet to help keep the stacked sheets in vertical alignment with each other and prevent horizontal movement of the sheets in response to the generally horizontal flow of wastewater. The preferred embodiment may also include a rod extending through a vertical passage in the center of the coalescing medium for further securing the plurality of stacked, perforated sheets together and stabilizing the medium. The rod includes a handle at one end which extends above the top of the improved coalescing medium and an H-shaped base at the other end which is in contact with and supports the bottom end of the coalescing medium. By grasping the handle, the coalescing medium is easily removed from the separator housing and transported.

In the preferred embodiment, each perforated, stackable sheet is constructed of premium grade polypropylene and is substantially square-shaped. Each sheet has dimensions of 12 inches by 12 inches and includes 24 by 24 square-shaped openings and 24 by 24 semi-circular recesses along the top surface and along the bottom surface of the sheet. The improved coalescing medium of the preferred embodiment comprises 24 stacked, perforated sheets and has a volume of one cubic foot and includes 90 square feet of surface area. Thus, for each five gallons per minute of water flow, there is a total of 90 square feet of coalescing surface area on which oil may contact the medium surface for increased separation efficiency. The improved oil coalescing medium includes approximately 576 vertical through passages and approximately 576 horizontal through passages communicating and extending throughout the medium. The semi-circular recesses are sized such that the combined total area of the horizontal tubular passages receiving the horizontal wastewater flow is approximately equal to the area of a six inch diameter pipe. Because the inlet pipe directing flow into the separator housing has a diameter which is typically substantially smaller than six inches, the improved oil coalescing medium does not obstruct or create undesirable resistance to or cause flow back of the wastewater flowing therethrough.

While the preferred embodiment of the improved oil coalescing medium is sized to be one cubic foot, it will be understood that the number of stacked sheets may be increased and/or a plurality of the preferred oil coalescing medium cubes may be stacked on top of one another and secured together to form an oil coalescing medium with greater height and increased surface area for use in a larger tank with increased flow rate. For example, a three foot high cubic oil coalescing medium may be used in connection with a 45 gallon tank. Likewise, a series of the preferred oil coalescing medium cubes may be arranged together in a side by side relationship to form a wider medium for use in a larger tank.

Therefore, it is an object and feature of the subject invention to provide a coalescing oil/water separator for removing free and dispersed oil from wastewater with increased separation efficiency.

It is an additional object and feature of the subject invention to provide a coalescing oil/water separator including an improved oil coalescing medium or matrix for separating oil out of wastewater and a series of baffles and weirs to direct flow, skim the separated oil and control the liquid level in the separator.

It is another object and feature of the subject invention to provide an improved coalescing medium which is uniquely designed and sized to maximize the surface area in and the flow rate through a given volume of coalescing medium.

It is yet another object and feature of the subject invention to provide an improved oil coalescing medium including a plurality of molded, stackable, perforated sheets or plates having a surface with an affinity for oil and increased surface area for inducing impingement of oil droplets on the medium surface.

It is an additional object and feature of the subject invention to provide an improved oil coalescing medium having openings and recesses which are aligned and positioned to form vertical and horizontal through passages between the stacked sheets of the medium to provide a plurality of closely spaced, communicating passages for maximizing the flow rate of wastewater through the coalescing medium while simultaneously maximizing the surface area of the medium.

Other objects and features will be readily apparent from the accompanying drawing and description.

DETAILED DESCRIPTION OF THE DRAWINGS

Figure 1:
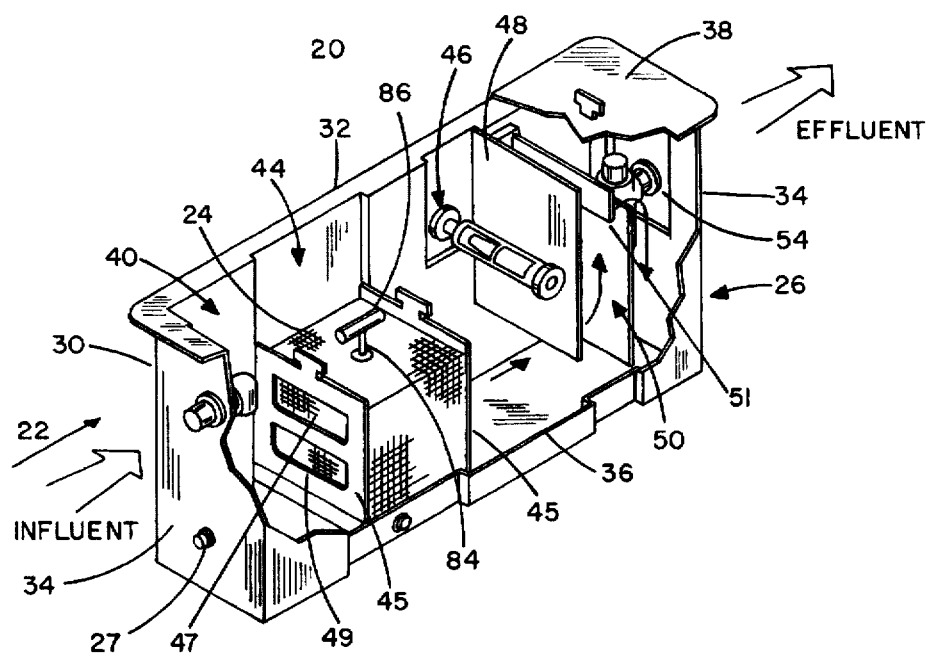
FIG. 1 is a perspective, cut-away view of a coalescing oil/water separator having an improved oil coalescing medium.

The subject invention is shown in FIGS. 1–12 and is directed to a coalescing oil/water separator designated generally by the numeral 20. The oil/water separator 20 of the subject invention is designed to separate and remove free and dispersed petroleum products from a substantially horizontal flow of wastewater 22 with increased separation efficiency while simultaneously permitting a maximum flow of wastewater through the oil/water separator 20. The oil/water separator of the subject invention is a coalescing system including an improved oil coalescing medium 24 for separating oil out of wastewater and a series of baffles and weirs to direct flow, skim the separated oil and control the liquid level in the oil/water separator. The subject invention is specifically directed to the improved oil coalescing medium or matrix 24 of the oil/water separator 20 (see FIG. 3) which provides an oil coalescing medium with twice the surface area of the prior art media in the same volume for increased separation efficiency while permitting a maximum flow rate of water through the medium without creating increased resistance which may cause flow back.

Figure 2:
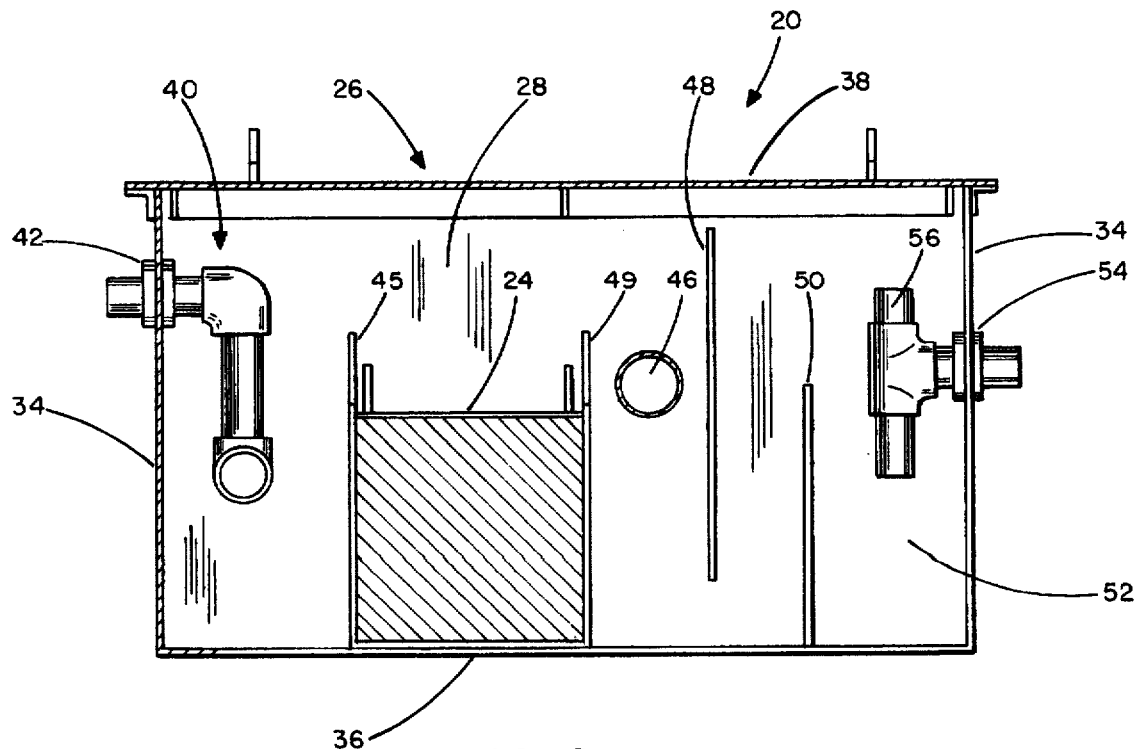
FIG. 2 is a side cross-sectional view of a coalescing oil/water separator having a rectangular housing and showing a separation chamber having an improved oil coalescing medium and a series of baffles and weirs to direct flow, skim oil and control liquid level in the separator.
Figure 3:
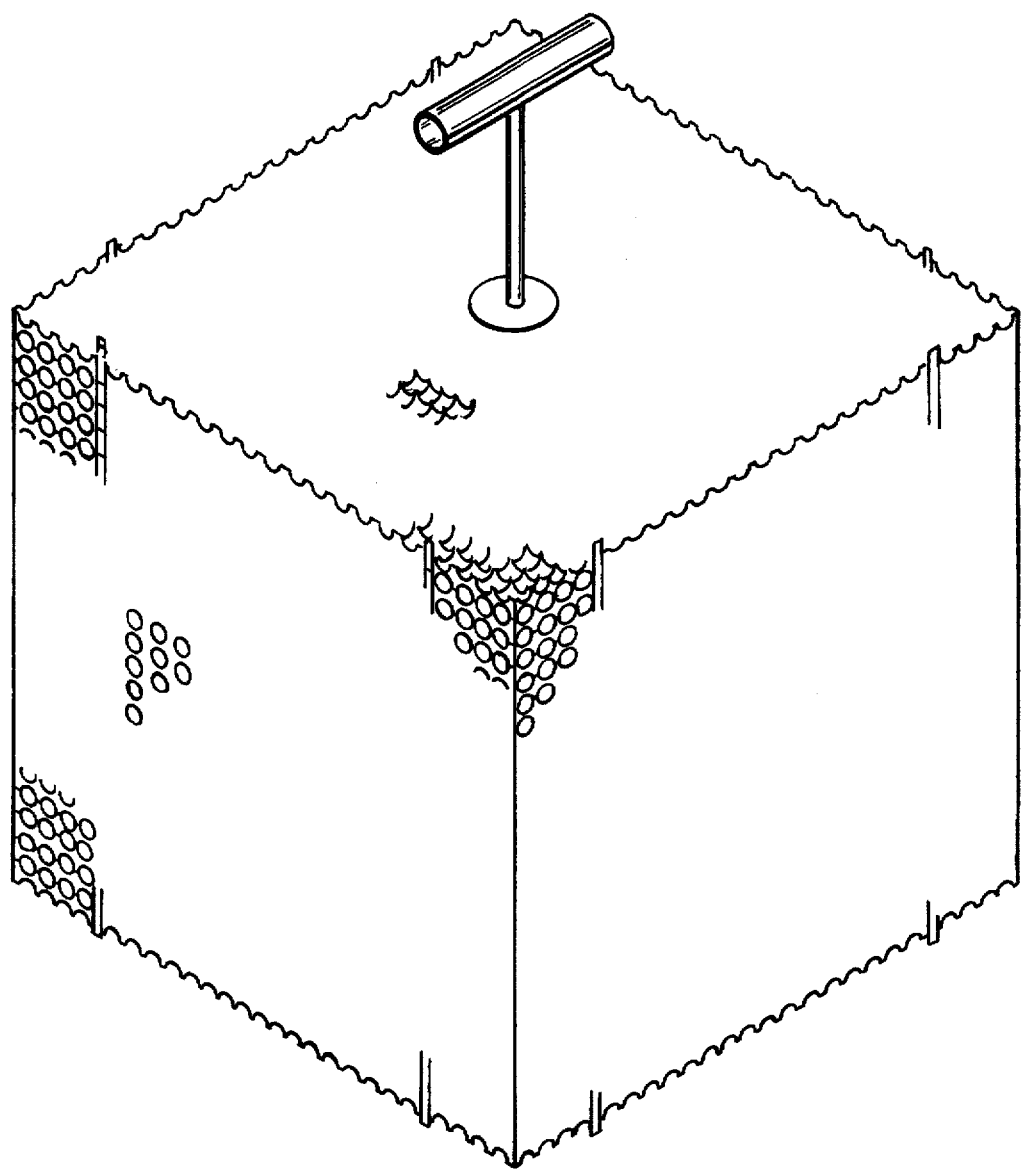
FIG. 3 is a perspective view of a plurality of stackable, perforated sheets stacked and secured together to form an improved, cube-shaped oil coalescing medium having a large surface area in proportion to its volume and a plurality of closely spaced, communicating horizontal and vertical passages.

As shown in FIGS. 1 and 2, the coalescing oil/water separator 20 includes a corrosion resistant housing 26 having a hollow interior 28, an exterior 30, opposite side walls 32, opposite end walls 34, a bottom 36 and a removable top 38. The preferred housing 26 is substantially rectangular and contains a series of chambers in the interior 28 of the housing 26. In the preferred embodiment, the housing 26 is a fiberglass tank shell, such as by way of example, a premium grade fiberglass reinforced polyester having ¼ inch minimum thickness and integral molded baffles. The housing 26 of the oil/water separator 20 of the subject invention may be a variety of sizes to accommodate various flow rates and total gallons of wastewater. The molded, fiberglass reinforced polyester design insures a rugged, leak proof, corrosion-resistant vessel for hostile environments. The entire exterior and interior surface of the preferred housing 26 is covered with corrosion-resistant gelcoat, integrally colored and ultraviolet resistant. The oil/water separator 20 may operate in temperatures up to 250 degrees Fahrenheit and is typically operated at a temperature of approximately 72 degrees depending on the type of industrial waste stream being treated and its temperature. As shown in FIG. 1, the housing 26 may also include a tank drain outlet 27.

The hollow interior 28 of the housing 26 of the oil/water separator 20 includes an inlet chamber 40 into which the flow of wastewater 22 is first received into the housing 26. The influent is received into the housing 26 through an entrance opening or inlet nozzle 42 located on one end wall 34 of the housing 26. The diameter of the inlet nozzle 42 may vary, but typically ranges from 1¼ inches to 4 inches. A separation chamber 44 is located adjacent to the inlet chamber 40. The separation chamber 44 is defined by a pair of dividers 45 positioned at either end of the separation chamber 44. The improved coalescing medium 24 is removably installed in the separation chamber 44 of the housing 26. The dividers 45 include an upper window 47 and a lower window 49 for evenly dispersing the flow of wastewater across the width and depth of the improved oil coalescing medium 24. As the wastewater flows through the improved medium 24, the unique design and flow pattern of the medium 24 promotes impingement of oil droplets on its surface. In the preferred embodiment, the oil coalesces and rises to the surface of the separator where it is automatically decanted by an oil skimming apparatus 46, such as by way of example, an adjustable rotary pipe skimmer, which is attached to one side wall 32 of the housing and positioned to skim the coalesced oil from the surface of the flow of water.

Once the coalesced oil is skimmed from the surface, the skimmed water flows under a baffle 48 which is positioned perpendicular to the top of the housing 26 with a space near the bottom. The oil retention baffle 48 retains the oil and allows the substantially oil-free water to continue under the baffle 48 through the housing 26 into the next chamber. In the next chamber, the water cascades over an effluent overweir 50 into a clean water chamber 52. The weir 50 maintains the water level and is positioned perpendicular to and against the bottom 36 of the housing 26. In addition, a sheen baffle 51 is located prior to the weir 50 and extends across the entire width of the housing 26. The sheen baffle 51 enhances separation of any remaining oil. As stated above, the preferred fiberglass housing 26 and baffles are molded as a single piece of fiberglass reinforced polyester. Clean water flows from the clean water chamber 52 and is discharged from the housing 26 through an outlet opening 54, such as by way of example, a tee pipe outlet 56. The size of the outlet opening 54 may vary and is equal to the size of the inlet opening 42, thus typically ranging from 1¼ inches to 4 inches in diameter. While not shown, the oil/water separator 20 of the subject invention may also include an oil storage reservoir for storing the separated and removed oil. The oil storage reservoir may be integral with the housing 26 and may vary in size.

Referring now to FIGS. 3–12, the subject invention is specifically directed to an improved oil coalescing medium or matrix 24 designed and sized to remove non-emulsified oil from the wastewater stream. The improved oil coalescing medium 24 is uniquely constructed to provide a lightweight, oil coalescing medium having an efficient, unvariegated wastewater flow pattern which promotes impingement of free and dispersed petroleum products on the surfaces of the medium 24 as the wastewater passes therethrough. The improved oil coalescing medium or matrix 24 includes a plurality of molded, stackable, perforated sheets or plates 60 having an oleophilic (oil attracting) surface 62 and an increased coalescing surface area for inducing impingement of oil droplets on the improved medium 24. It is a feature of the subject invention to provide an improved medium 24 which has a large surface area in proportion to the volume of the medium, as compared to prior art media, for increasing separation efficiency by providing substantial surface contact areas for attracting oil and on which the oil may attach and coalesce.

Figure 4:
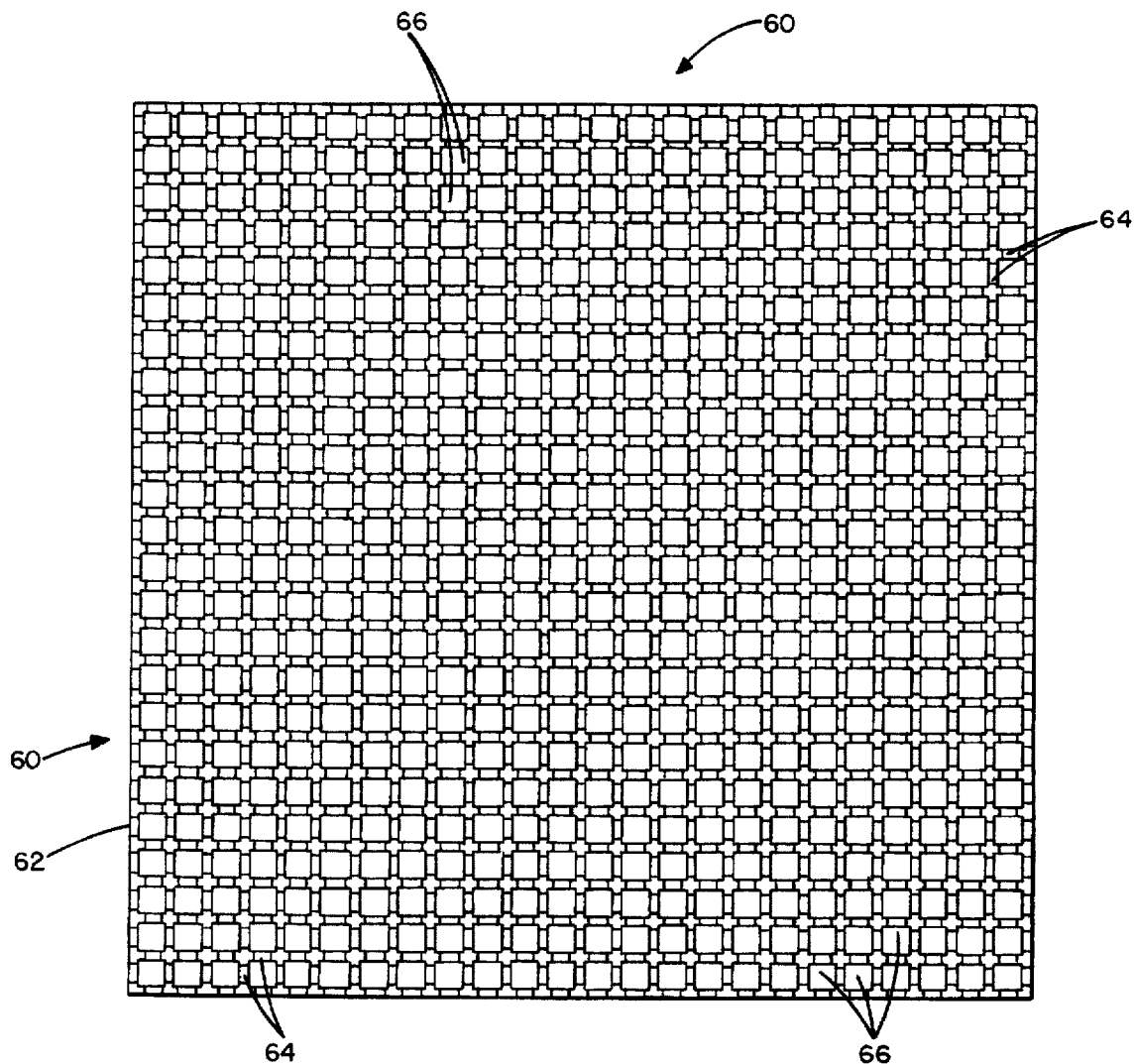
FIG. 4 is an overhead view of a stackable, perforated sheet showing the grid formation of the sheet and the plurality of square-shaped openings extending across the length and width of the sheet.

As best seen in FIG. 4, each stackable, perforated sheet 60 has generally a grid formation with horizontal and perpendicular strips or portions 64 and a plurality of openings 66 covering the sheet 60 and located between each of the horizontal and perpendicular portions 64. Each stackable, perforated sheet 60 has a thickness T, a top surface 61 and a bottom surface 63 with the plurality of openings 66 extending through the top and bottom surfaces 61, 63. In the preferred embodiment, the thickness T is approximately 0.50 inches and each sheet is constructed of a rigid, plastic material having an affinity for oil, such as by way of example, polypropylene. As shown in FIGS. 5-8, the top surface 61 and the bottom surface 63 include a plurality of recesses 68 along the horizontal and perpendicular portions 64 of the grid formation. Each of the recesses 68 on the bottom surface 63 of each sheet 60 are shaped and aligned to mirror the recesses 68 on the top surface 61 of the sheet 60 and to support the adjacent stacked sheets.

When the sheets 60 are stacked together, the openings 66 of each stackable sheet 60 are positioned and aligned to form vertical through passages 70 between the stacked sheets of the medium 24. Likewise, the recesses 68 along the top and bottom surfaces 61, 63 of each sheet 60 are positioned and aligned such that the recesses 68 of adjacently stacked sheets 60 are directly opposite one another and the horizontal and perpendicular portions 64 of one sheet engage like horizontal and perpendicular portions 64 of the adjacent sheet to form horizontal through passages 72 between the stacked sheets 60 of the medium 24. The recesses 68 and openings 66 of the preferred embodiment are sized to permit maximum flow of wastewater through the medium 24 while providing maximum surface area to promote impingement of free and dispersed petroleum products on the surface area of the medium 24. Thus, the unique grid formation design of each sheet 60 with openings 66 and recesses 68 on the opposite surfaces 61, 63 of the sheet provide an improved medium 24 with numerous closely spaced, horizontal and vertical communicating passages 70, 72 for maximizing the flow rate of a generally horizontal flow of wastewater through the coalescing medium 24 while simultaneously maximizing the surface area of the medium 24.

Figure 5:
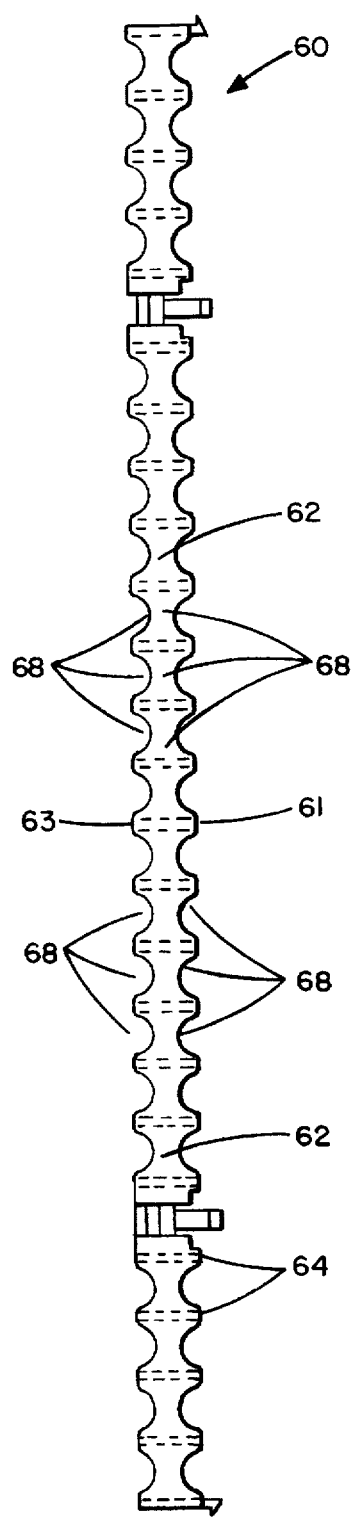
FIG. 5 is a side view of a stackable, perforated sheet showing the thickness of the sheet and the plurality of semi-circular recesses along the top and bottom surfaces of each sheet.
Figure 6:
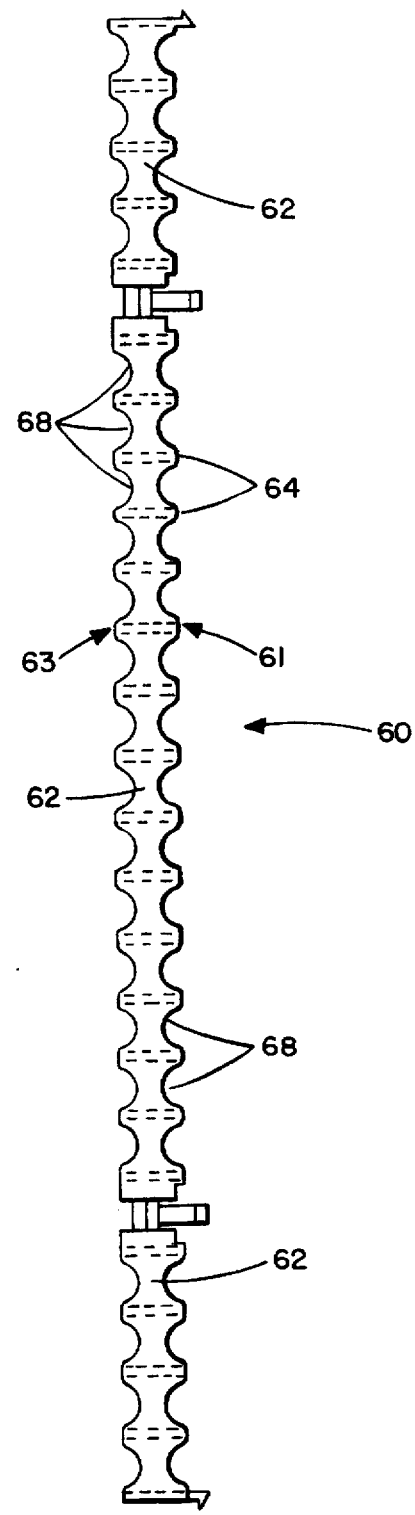
FIG. 6 is a front view of a stackable, perforated sheet showing the thickness of the sheet and the plurality of semi-circular recesses along the top and bottom surfaces of each sheet.
Figure 7:
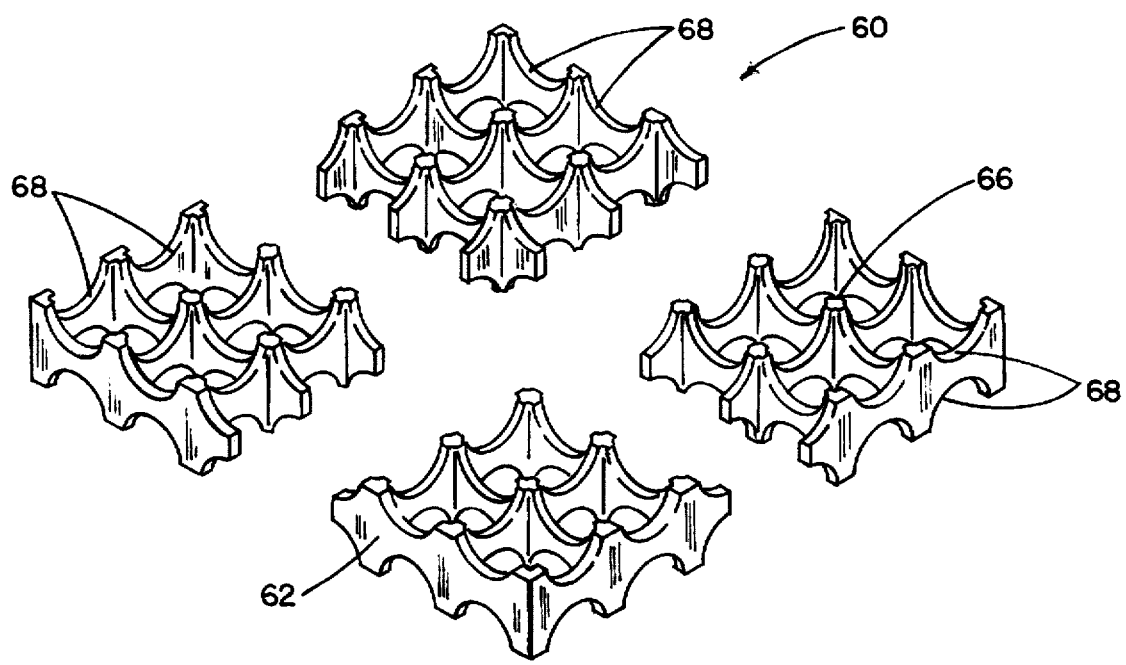
FIG. 7 is an isometric view of a stackable, perforated sheet comprising the improved oil coalescing medium and showing the plurality of semi-circular recesses along the surface of the sheet.
Figure 8:
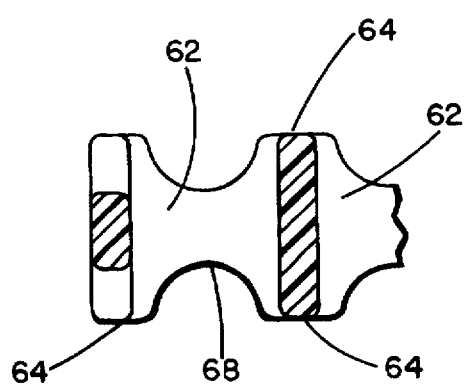
FIG. 8 is an enlarged view taken along section 8—8 of FIG. 4 showing a semi-circular recess on the top surface and the mirroring semi-circular recess on the bottom surface of a portion of a sheet.
Figure 9:
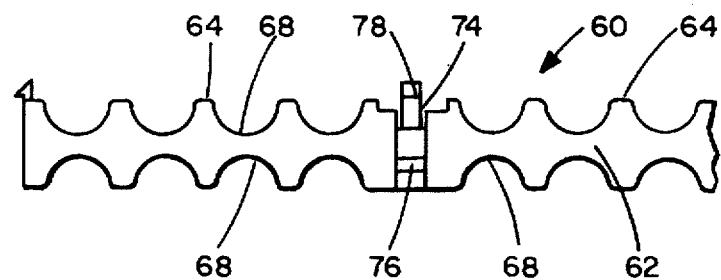
FIG. 9 is an enlarged side view of a stackable, perforated sheet and an integral latching device formed on the side edge of the sheet for securing the stacked sheets together.

In the preferred embodiment, the openings 66 in each sheet are substantially rectangular-shaped so that the vertical passages 70 extending vertically through the medium 24 are substantially rectangular-shaped. As best seen in FIG. 4, the openings 66 are squares, each square having a perimeter defined by the horizontal and perpendicular portions 64 of the grid formation. As shown in FIG. 7, the horizontal and perpendicular portions 64 of the perimeter grid formation bordering each opening 66 include four recesses 68 along the top surface 61 and four mirroring recesses 68 along the bottom surface 63 of the sheet. In the preferred embodiment, the recesses 68 are semi-circular, as shown in FIGS. 5-8, such that when the sheets 60 are stacked, the recesses 68 of adjacently stacked sheets 60 are directly opposite one another so that the two semi-circular recesses directly opposite one another form circular recesses and the horizontal through passages 72 formed by the adjacently stacked sheets 60 are tubular (see FIG. 3).

The improved oil coalescing medium 24 of the subject invention also includes an attachment means for interlocking and securing the plurality of perforated, stacked sheets 60 together. In the preferred embodiment, the attaching means is a latching device 74 having opposite ends and an integral slot 76 at one end and a hook member 78 at the other end. (See FIG. 9). When the perforated, stackable sheets 60 are stacked together, the integral slot 76 of one sheet 60 receives the hook member 78 of the adjacent sheet 60 to lock the series of sheets 60 together. In the preferred embodiment, each sheet includes two latching devices 74 on each side of its perimeter for a total of eight latching devices 74. Each latching device 74 is located near the ends of each side and preferably the distance of four openings 66 separates the latching devices 74 from each end of the sheet 60.

Figure 10:
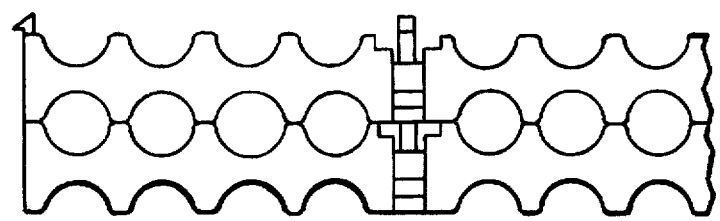
FIG. 10 is an enlarged side view of a portion of a sheet showing the notch on the top surface and an enlarged view of the adjacent sheet showing the complementary pin which fits in the notch.

As shown in FIG. 10, each sheet 60 may also include at least one small duct or notch 80 on one surface at the intersection of a horizontal and perpendicular portion and a complementary pin or dowel 82 located at the same place on the opposite surface of the sheet 60. When the plurality of sheets 60 is stacked in vertical alignment with one another, the pin 82 of one sheet fits in the notch 80 of the adjacent stacked sheet 60 to help keep the stacked sheets 60 in vertical alignment with each other and to prevent horizontal movement of the sheets 60 in response to the generally horizontal flow of wastewater through the improved medium 24. Each sheet 60 of the preferred embodiment is substantially square-shaped and includes four notches 80, one near each corner of the sheet 60, on the top surface 61 of the sheet 60 and four pins 82 on the bottom surface 63 located at the same place that the notches 80 are located at on the top surface 63.

Figure 11:
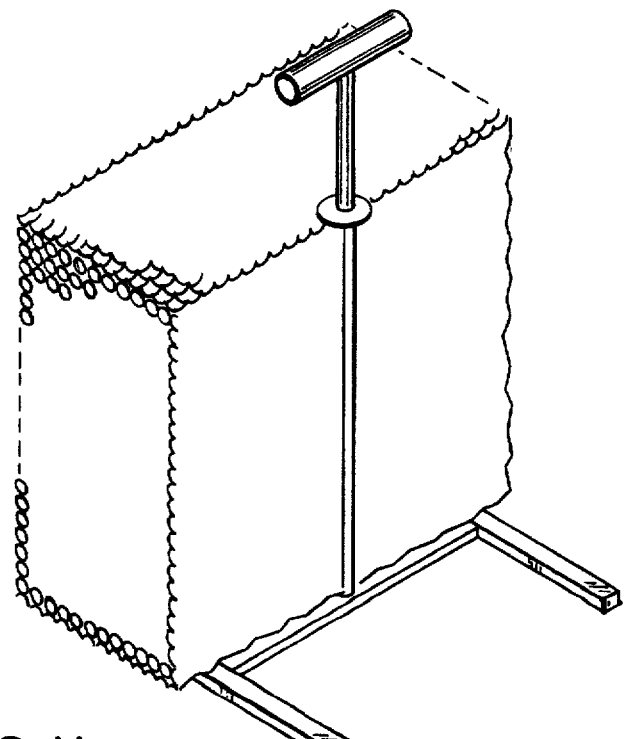
FIG. 11 is a cross-section view of the cube-shaped coalescing medium showing a rod extending through the center of the medium which further secures the sheets together and a carrying handle extending from the top end of the rod for transporting the medium.

In addition, the improved coalescing medium 24 of the subject invention may include a rod 84 extending through the center of the coalescing medium 24 for further securing the plurality of stacked, perforated sheets 60 together and stabilizing the medium 24. In the preferred embodiment, the rod 84 extends through a vertical through passage 70 in the center of the medium 24 and has one end 83 which extends above the top of the medium and the other end 85 which culminates at the bottom of the medium. As shown in FIG. 11, the rod 84 may include a handle 86 attached to the top end 83 and a base 88 attached to the bottom end 85 of the rod 84. The base 88 is preferably an H-shaped base which is in contact with the bottom surface 63 of the sheet 60 at the bottom of the stack and provides support to the improved medium 24 when it is lifted or moved. By grasping the handle 86, the improved coalescing medium 24 is readily removed from the housing 26 for easily cleaning the matrix or medium 24.

In the preferred embodiment, each perforated, stackable sheet 60 is constructed of premium grade polypropylene and has dimensions of approximately twelve inches by twelve inches and is one half inches thick. Each sheet 60 has twenty-four square-shaped openings 66 extending horizontally across each row of the grid formation and twenty-four square-shaped openings 66 extending vertically across each column of the grid formation such that there are a total of five hundred seventy-six openings covering the sheet 60. Each opening is approximately 0.1681 square inches and permits the coalesced oil to rise to the surface. The length of each horizontal and perpendicular portion comprising the perimeter around the opening is approximately 0.410 inches and the thickness of each of the horizontal and perpendicular portions of the sheet is approximately 0.100 inches. As shown in FIGS. 5 and 6, twenty-four semi-circular recesses 68 are formed along each column and row of both the top and bottom surfaces 61, 63 of the horizontal and perpendicular portions. The radius of the preferred semi-circular recess 68 is approximately 0.15 inches. In addition, the surface of the horizontal and perpendicular portions may be slightly curved at each intersection of the portions throughout the grid formation. The radius of the portion at the intersection is approximately 0.030 inches.

In the preferred embodiment, the improved oil coalescing medium 24 includes twenty-four stackable, perforated sheets stacked upon each other and attached together by the latching device 74 and by the rod 84 extending through the center of the medium. The improved medium 24 having twenty-four stacked sheets 60 includes a total of approximately five hundred seventy-six tubular, horizontal through passages 72. As noted above, the radius of each semi-circular recess 66 and of the tubular passages 72 formed by stacking semi-circular recesses of adjacent sheets together is 0.150 inches. Thus, the total number of tubular horizontal passages is approximately equal to a six inch diameter tubular passage. Because the wastewater flow is entering the housing through the nozzle 42 having a one and one-half inch diameter and the horizontal passages of the medium are essentially equal to a six inch passage, the presence of the improved medium 24 does not create resistance to the flow of wastewater or cause flow back. The volume of the improved coalescing medium 24 having twenty-four stacked sheets is one cubic foot and the improved medium "cube" 24 includes approximately ninety square feet of surface area. Thus, the improved coalescing medium 24 includes approximately five hundred seventy-six vertical through passages and five hundred seventy-six horizontal through passages communicating and extending throughout the medium. For each five gallons per minute of water flow, there is a total of ninety square feet of surface area on which oil may contact the medium surface for increased separation efficiency.

While the preferred embodiment illustrates a plurality of sheets 60 stacked and secured together to form an improved oil coalescing medium 24 having a volume of one cubic foot, it will be understood that the size of each stackable, perforated sheet may be increased and/or a plurality of improved medium cubes may be stacked vertically upon one another and secured together to form an oil coalescing medium with greater height and increased surface area for use in connection with a larger tank shell and increased water flow rate. Likewise, a series of improved medium cubes may be positioned in a side by side relationship to form a longer medium for use in a larger tank. For example, a two cubic foot medium with EL coalescing surface area of 180 square feet could be used with an influent flow rate of 10 gallons per minute, a three cubic foot medium with a surface area of 270 square feet could be used with an influent flow rate of 15 gallons per minute and a four cubic foot medium with a surface area of 360 square feet accommodates an influent flow rate of 20 gallons per minute. To remove free and dispersed oils from a large flow of wastewater, such as 45 gallons per minute, a medium assembled of nine mediums, each having a volume of one cubic foot, with a total coalescing surface area of 810 square feet could be used.

Figure 12:
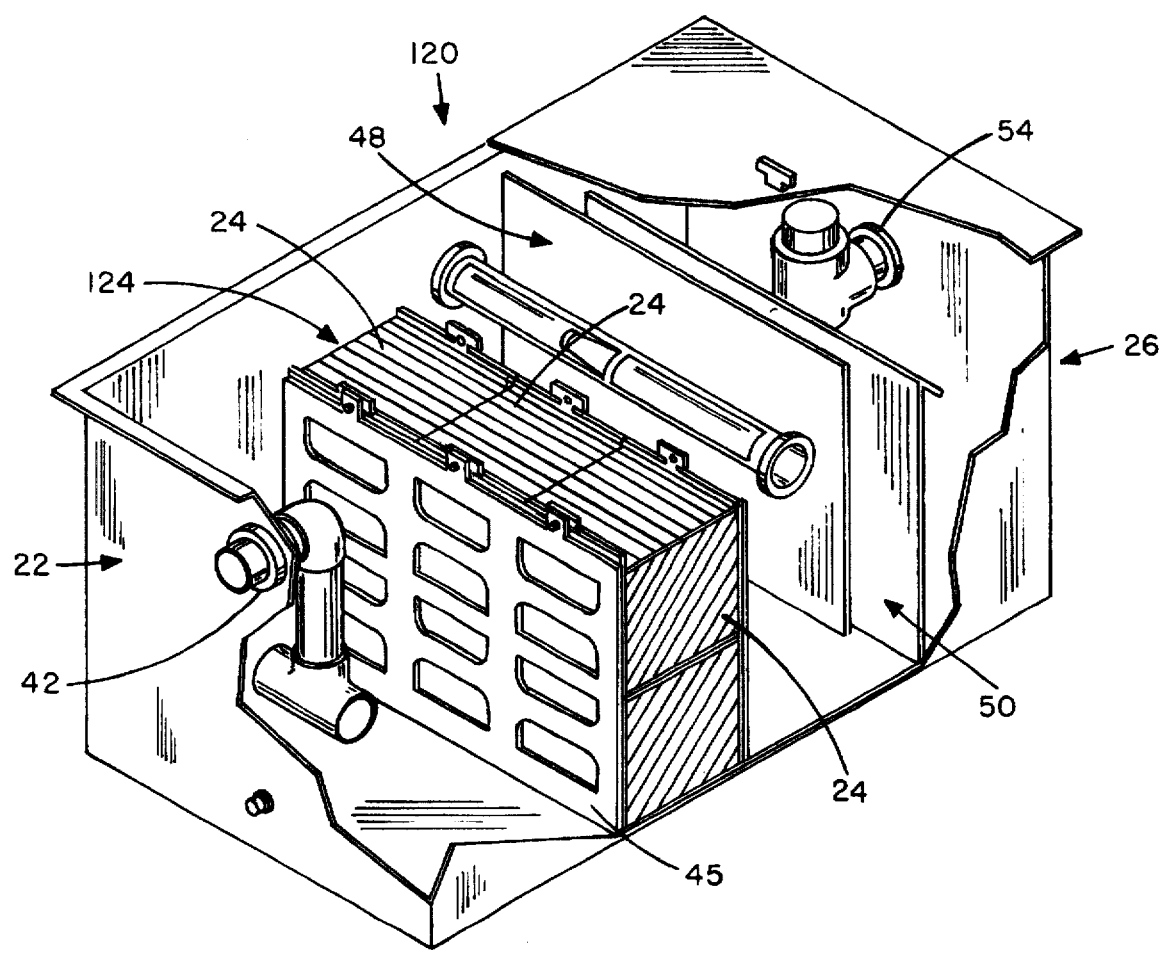
FIG. 12 is a perspective, cut-away view of a coalescing oil/water separator with an increased size to accommodate an increased volume and flow of wastewater and showing an improved coalescing medium constructed of six stacked improved medium cubes arranged and secured together for removing the oil out of the wastewater.

FIG. 12 illustrates an oil water separator 120 having an increased capacity for treating wastewater. The separator 120 includes six improved medium cubes 24, each having a volume of one cubic foot, stacked and secured together to provide an enlarged oil coalescing medium 124 for maintaining the increased separation efficiency and maximized flow of water for an increased flow and greater volume of wastewater to be treated. The separator 120 is typically used for a wastewater flow of 30 gallons per minute. As shown in FIG. 12, there are three base cubes positioned side by side and three cubes stacked vertically on the base cubes. By increasing the number of coalescing cubes, the square footage of the coalescing surface area is increased from ninety square feet to five hundred forty square feet which permits a substantially increased flow rate through the coalescing medium without diminishing the increased separation efficiency of the subject invention.

While specific embodiments and features of the invention have been disclosed herein, it will be readily understood that the invention encompasses all enhancements and modifications within the scope and spirit of the following claims.

What is claimed is:

1. A separator for removing free and dispersed petroleum products from a wastewater stream comprising:

a plurality of stackable, perforated sheets having an oil-attracting surface, said sheets being stacked together to form an oil coalescing medium having a pre-determined surface area and volume adapted to receive therethrough a generally, horizontal flow of wastewater, wherein said medium is adapted to provide an unvariegated wastewater flow pattern to promote impingement of free and dispersed petroleum products on the surface of the medium, and wherein said oil coalescing medium is adapted to provide surface areas for contacting wastewater flowing through said medium and for attracting oil thereon to separate the free and dispersed petroleum products from the wastewater; and each perforated, stackable sheet comprising generally a grid formation having a pre-determined thickness, a top and bottom surface, and a plurality of openings extending through the top and bottom surfaces, said top and bottom surfaces of the grid further comprising a plurality of recesses along the grid surfaces.

2. The separator of claim 1, wherein the recesses on the bottom surface of each sheet are shaped and aligned to mirror the recesses on the top surface of said sheet.

3. The separator of claim 2, wherein said openings of each stackable sheet are positioned and aligned to form vertical through passages between the stacked sheets of the medium, said openings permitting coalesced oils to rise through said vertical passages.

4. The separator of claim 3, wherein said recesses along the top and bottom surfaces of each sheet are positioned such that the recesses of adjacently stacked sheets are directly opposite one another to form horizontal through passages between the stacked sheets of the medium to provide a plurality of closely spaced, communicating passages adapted to permit a flow rate of a generally horizontal flow of wastewater through the coalescing medium while simultaneously providing the surface area of the medium.

5. The separator of claim 4, wherein said recesses and openings are sized to permit flow of wastewater therethrough while providing surface area to promote impingement of free and dispersed petroleum products on the surface area of the medium.

6. The separator of claim 4, wherein the openings in each sheet are substantially rectangular-shaped and said vertical passages extending vertically through the medium are substantially rectangular-shaped.

7. The separator of claim 6, wherein the horizontal and perpendicular portions of the grid formation defining the perimeter of each substantially rectangular-shaped opening in the sheet include recesses along the top and bottom surfaces of said portions.

8. The separator of claim 7, wherein each opening is bordered by four recesses along the top surface of the horizontal and perpendicular portions of the perimeter grid formation and four recesses along the bottom surface of the horizontal and perpendicular portions of the perimeter grid formation bordering said opening.

9. The separator of claim 7, wherein said recesses are semi-circular and wherein said horizontal passages formed between adjacent stacked sheets and extending horizontally through the medium are tubular for receiving a generally horizontal flow of wastewater therethrough.

10. The separator of claim 9, wherein each sheet comprises approximately twenty-four by twenty-four openings and approximately twenty-four by twenty-four semi-circular recesses along the top surface of the sheet and twenty-four by twenty-four semi-circular recesses along the bottom surface of the sheet.

11. The separator of claim 9, wherein each sheet is substantially square-shaped and, said oil coalescing medium is substantially cube-shaped.

12. The separator of claim 11, wherein said oil coalescing medium comprises approximately twenty-four stacked sheets attached together.

13. The separator of claim 12, wherein the total number of horizontal through passages in said medium is approximately 576 and has an flow-through area approximately equal to the flow-through area of a 6 inch diameter pipe.

14. The separator of claim 11, wherein the dimensions of each sheet are approximately twelve inches by twelve inches.

15. The separator of claim 14, wherein the volume of the substantially cube-shaped medium is approximately one cubic foot.

16. The separator of claim 15, wherein the surface area of the substantially cube-shaped medium is approximately 90 square feet.

17. The separator of claim 9, wherein each sheet is comprised of a rigid, plastic material.

18. The separator of claim 17, wherein said rigid, plastic material is polypropylene.

19. The separator of claim 1, said plurality of stacked sheets further including an attachment means for securing said stacked sheets together to form the oil coalescing medium.

20. The separator of claim 19, each stackable, perforated sheet further including an alignment means for preventing the stacked sheet in the medium from moving horizontally relative to the adjacent stacked sheets.

21. The separator of claim 20, said alignment means comprising at least one small notch on one surface of the sheet and a complementary pin or dowel at the same location on the opposite surface of said sheet, wherein said pin of one sheet fits in the notch of an adjacent, stacked sheet to help keep the stacked sheets in vertical alignment and prevent horizontal movement of the sheets in response to the flow of wastewater.

22. The separator of claim 19, wherein said attachment means is a latching device.

23. The separator of claim 22, said latching device comprising an integral 1 slot at one end and a hook at the other end wherein the integral slot of one stacked sheet receives the hook of the adjacent stacked sheet to lock a series of sheets together.

24. The separator of claim 19, wherein said attachment means is a rod extending through the center of said sheets.

25. The separator of claim 24, wherein said rod has a top end and a bottom end and extends through one of the vertical through passages in the center of said stacked sheets of the medium, said top end extending above the top sheet of the medium.

26. The separator of claim 25, said rod further including a handle, said handle extending above said medium for transporting the plurality of stacked sheets whereby said medium is removable and readily cleaned.

27. The separator of claim 20, said rod further including a base secured to the bottom end of the rod and engaging the bottom surface of the bottom stacked sheet to provide support to the medium.

28. The separator of claim 27, wherein said base is H-shaped.

29. A coalescing system for separating and removing oil from a flow of water comprising:

a leakproof housing having a hollow interior, opposite side walls, a bottom and a removable top;

an inlet chamber in the housing, said inlet chamber including an entrance opening in one side wall of the housing for receiving a flow of water;

a separation chamber adjacent to the inlet chamber, said separation chamber having a separator comprising a plurality of perforated sheets including an oleophilic surface and being stackable together to form an oil coalescing matrix, said matrix having a surface area and a plurality of communicating passages adapted to permit the flow of water through the coalescing matrix while simultaneously providing the surface area of the matrix;

an oil removal apparatus adjacent to the separation chamber for removing oil separated from the wastewater by the separator;

an outlet chamber including an exit opening in one side wall of the housing for discharging the treated wastewater from the housing;

whereby said oil coalescing matrix is adapted to provide surfaces areas for contacting wastewater flowing through said matrix and to provide surface areas for attracting oil thereon; and wherein each perforated, stackable sheet comprises a generally grid formation having a pre-determined thickness, a top and bottom surface, and a series of perforations extending through the top and bottom surfaces, said top and bottom surfaces of the grid further including a series of indentions along the grid surfaces.

30. The coalescing system of claim 29, wherein the indentions on the bottom surface of each sheet are shaped and aligned to mirror the indentions on the top surface of said plate.

31. The coalescing system of claim 30, wherein said perforations of each stackable sheet are positioned and aligned to form vertical through passages between the stacked plates of the matrix, said perforations permitting coalesced oils to float upwardly through said vertical passages.

32. The coalescing system of claim 31, wherein said indentions along the top and bottom surfaces of each sheet are positioned such that the indentions of adjacently stacked sheets are directly opposite one another to form horizontal through passages between the stacked sheets of the matrix to provide a plurality of closely spaced, communicating passages adapted to permit a flow rate of a generally horizontal flow of wastewater through the coalescing matrix while simultaneously providing the surface area of the matrix.

33. The coalescing system of claim 32, said plurality of stacked plates further including an attachment means for securing said stacked sheets together to form and secure the oil coalescing matrix.

34. The coalescing system of claim 33, wherein said attachment means is a latching device.

35. The coalescing system of claim 34, said latching device comprising an integral slot at one end and a hook at the other end wherein the integral slot of one stacked sheet receives the hook of the adjacent stacked sheet to lock a series of sheets together.

36. The coalescing system of claim 34, wherein said attachment means is a rod having a top end and a bottom end, said rod extending through the center of said stacked sheets and including a handle at the top end; said rod further including a handle at the top end, said handle extending above said medium for lifting the plurality of stacked sheets, and further including a base at the bottom end for supporting the bottom of the medium.

37. The coalescing system of claim 33, wherein the perforations in each plate are substantially rectangular-shaped and said vertical passages extending vertically through the medium are substantially rectangular-shaped and wherein said indentions are semi-circular and wherein said horizontal passages formed between adjacent stacked sheets and extending horizontally through the matrix are tubular for receiving a generally horizontal flow of wastewater therethrough.

38. The coalescing system of claim 37, wherein the horizontal and perpendicular portions of the grid formation defining the perimeter of each substantially rectangular-shaped perforation in the plate include indentions along the top and bottom surfaces of said portions.

39. The coalescing system of claim 38, wherein each plate is substantially a square and said oil coalescing matrix is substantially a cube.

40. The coalescing system of claim 39, wherein said oil coalescing matrix comprises approximately twenty-four sheets stacked upon one another and attached together.

41. The coalescing system of claim 40, wherein each plate comprises approximately twenty-four by twenty-four perforations and approximately twenty-four by twenty-four semi-circular indentions along the top surface of the plate and twenty-four by twenty-four semi-circular indentions along the bottom surface of the plate.

42. The coalescing system of claim 41, wherein the volume of the substantially cube-shaped matrix is approximately one cubic foot and the surface area is approximately 90 square feet.

43. The coalescing system of claim 39, wherein each plate is comprised of a rigid, plastic material.

44. The coalescing system of claim 43, wherein said rigid, plastic material is polypropylene.

45. The coalescing system of claim 29, wherein said entrance opening comprises an inlet nozzle in one side wall of the housing.

46. The coalescing system of claim 45, wherein said oil removal apparatus further comprises:

a. an oil skimmer adjacent to the separation chamber, said skimmer having an adjustable rotary pipe;
   b. an oil retention baffle adjacent to the oil skimmer, said baffle defining a barrier under which treated water flows; and
   c. a weir adjacent to the oil retention baffle for maintaining the water lever and over which water cascades into the outlet chamber.

47. The coalescing system of claim 46, wherein said outlet chamber further comprises a clean water chamber having a tee pipe outlet in one side of the housing through which the clean water exits the housing.

48. A method for separating and removing oil from a flow of wastewater in a coalescing system including an inlet chamber, a separation chamber having an oil coalescing media formed by a series of stackable, perforated sheets having a surface area and a volume of the media, each perforated, stackable sheet of said medium comprising a grid-type formation having a pre-determined thickness and a top and bottom surface, a plurality of openings extending through the top and bottom surfaces, a plurality of recesses along the top and bottom grid surfaces, wherein the recesses on the bottom surface of each sheet are shaped and aligned to mirror the recesses on the top surface of said sheet, and an oil skimmer and a clean water chamber including an outlet for discharged treated wastewater, the steps comprising:

feeding a flow of wastewater into the inlet chamber of the system;
   dispersing the flow of wastewater evenly across the depth and width of the oil coalescing media in the separation chamber, wherein said wastewater flow contacts the surface area of the media while flowing therethrough;
   attaching droplets of oil to the surface of the coalescing media and coalescing said droplets of oil into globules of oil;
   skimming the coalesced oil from the surface of the wastewater flow; and
   producing a clean water flow from the outlet of the system.

49. The method of claim 48, wherein said openings of each stackable sheet are positioned and aligned to form vertical through passages between the stacked sheets of the medium, said openings permitting coalesced oils to rise through said vertical passages, and wherein said recesses along the top and bottom surfaces of each sheet are positioned such that the recesses of adjacently stacked sheets are directly opposite one another to form horizontal through passages between the stacked sheets of the medium to provide a plurality of closely spaced, communicating passages for permitting the flow rate of a generally horizontal flow of wastewater through the coalescing medium while simultaneously providing the surface area of the medium.

50. The method of claim 48, comprising a further step of passing the wastewater exiting from the oil skimmer under an oil retention baffle.

51. The method of claim 50, comprising a further step of passing the water exiting from the oil retention baffle over a weir which maintains the water level.

52. A coalescing component for a separator of a type including an oil coalescing matrix for separating and removing petroleum products from a flow of wastewater, comprising:

a perforated sheet having an oil-attracting surface and defining a grid formation having a top and a bottom surface, and a plurality of openings extending through the top and bottom surfaces, the top and bottom surfaces having a plurality of recesses along the grid surfaces, and the perforated sheet being stackable to form the oil coalescing matrix.

\* \* \* \* \*